(12) United States Patent
Malaviarachchi et al.

(10) Patent No.: US 8,646,027 B2
(45) Date of Patent: Feb. 4, 2014

(54) WORKFLOW BASED AUTHORIZATION FOR CONTENT ACCESS

(75) Inventors: Rushmi U. Malaviarachchi, Redmond, WA (US); Kenneth D. Ray, Seattle, WA (US); Scott C. Cottrille, Sammamish, WA (US); Frederic Delombaerde, Redmond, WA (US); Conrad G. Bayer, Ottawa, CA (US)

(73) Assignee: Microsoft Corporation, Redmond, WA (US)

( * ) Notice: Subject to any disclaimer, the term of this patent is extended or adjusted under 35 U.S.C. 154(b) by 1217 days.

(21) Appl. No.: 12/163,378

(22) Filed: Jun. 27, 2008

(65) Prior Publication Data

US 2009/0328156 A1 Dec. 31, 2009

(51) Int. Cl.
| G06F 17/00 | (2006.01) |
| G06F 7/04 | (2006.01) |
| G06F 12/00 | (2006.01) |
| G06F 12/14 | (2006.01) |
| G06F 13/00 | (2006.01) |
| G06F 17/30 | (2006.01) |
| G11C 7/00 | (2006.01) |
| H04L 29/06 | (2006.01) |
| H04N 7/16 | (2011.01) |

(52) U.S. Cl.
USPC .................................. 726/1; 21/27

(58) Field of Classification Search
None
See application file for complete search history.

(56) References Cited

U.S. PATENT DOCUMENTS

| 5,911,143 A | 6/1999 | Deinhart et al. |
| 6,088,679 A | 7/2000 | Barkley |

(Continued)

FOREIGN PATENT DOCUMENTS

WO WO 2006078769 7/2006

OTHER PUBLICATIONS

Bertino, Elisa, et al., "A Flexible Model Supporting the Specification and Enforcement of Role-based Authorizations in Workflow Management Systems", Jan. 1997, 11 pages.

(Continued)

*Primary Examiner* — Kambiz Zand
*Assistant Examiner* — Trong Nguyen
(74) *Attorney, Agent, or Firm* — Workman Nydegger (57) ABSTRACT

The present invention extends to methods, systems, and computer program products for workflow based authorization for content access. A workflow can be triggered when a protection policy does not fully express an intended recipient's rights in protected content. A workflow processes relevant inputs to more fully express the intended recipient's rights in protected content. Workflows can provide policy item updates and authorizations decisions with respect to protected content. Through the use of workflows to make an authorization decision, access to information can become more flexible, allowing it to follow the desired flow of information throughout its lifecycle. This flexibility allows organizations to protect their information without worrying about the protection stopping the natural flow of business.

20 Claims, 2 Drawing Sheets (56) References Cited

U.S. PATENT DOCUMENTS

| | | |
|---|---|---|
| 6,158,010 A | 12/2000 | Moriconi |
| 7,035,850 B2 | 4/2006 | Arai et al. |
| 2002/0152254 A1 | 10/2002 | Teng |
| 2004/0098594 A1 | 5/2004 | Fleming et al. |
| 2005/0028006 A1 | 2/2005 | Leser |
| 2005/0232423 A1 | 10/2005 | Horvitz et al. |
| 2005/0256947 A1 | 11/2005 | Devarakonda |
| 2006/0089938 A1 | 4/2006 | Leonard |
| 2006/0253314 A1 | 11/2006 | Reznichenko et al. |
| 2006/0277595 A1 | 12/2006 | Kinser et al. |
| 2008/0016239 A1* | 1/2008 | Miller et al. .......... 709/234 |
| 2008/0028436 A1 | 1/2008 | Hannel et al. |
| 2008/0072290 A1 | 3/2008 | Metzer et al. |
| 2008/0163347 A1* | 7/2008 | Ratcliff et al. .......... 726/6 |

OTHER PUBLICATIONS

Wu, Shengli, et al., "Authorization and Access Control of Application Data in Workflow Systems", Journal of Intelligent Information Systems, 18 (1), Kluwer Academic Publishers, Jan. 2002, pp. 71-94, 33 pages.

* cited by examiner

WORKFLOW BASED AUTHORIZATION FOR CONTENT ACCESS

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic content. Accordingly, the performance of many computing tasks are distributed across a number of different computer systems and/or a number of different computing components.

Nonetheless, although electronic content may be accessible to a number of computer systems, the creator of the electronic content may desire to limit access to the electronic data. In some environments, one or more access mechanisms, such as, for example, password protection, setting file attributes, (e.g., read-only, etc.), firewalls, etc., can be used to limit access to electronic content. These mechanisms provide essentially the same level of electronic content access to anyone who is authorized. However, if a user can access a file, there is typically no limitation on what that user can do with the contents of a file. For example, if a user can read a file, the user can copy the file to another location in which others may be able to access the file, the user can print the file and leave a hardcopy somewhere, etc, typically with no limitations.

As a result, in some environments, a creator of electronic content may desire more configurable and/or granular access control to their electronic content. In these other environments, a content creator can use Digital Rights Management (DRM) to control access to their electronic content. DRM generally includes access control technologies used by content creators to limit usage of electronic content (or instances thereof). Thus, various different types of DRM have been developed to protect different types of electronic content, such as, for example, pictures, movies, videos, music, programs, multi-media, games, documents, etc.

One category of DRM, Enterprise Rights Management (ERM) is often used to control access to documents, such as, for example, electronic mail messages, word processing documents, and web pages, etc. Rights Management Services (RMS) is an ERM solution. RMS can be used to encrypt documents, and through server-based policies, prevent the documents from being decrypted except by specified people or groups, in certain environments, under certain conditions, and for certain periods of time. Document-based operations like printing, copying, editing, forwarding, and deleting can be allowed or disallowed for individual documents. RMS administrators can deploy RMS templates that group these rights together into predefined policies that can be applied en masse to content.

Accordingly, RMS-protected content can be created by RMS-enabled applications. RMS-protected content is encrypted and can contain an embedded Usage Policy, which defines the rights each user or group has to the content. An RMS system works by assigning rights to trusted entities, which are either single users or groups of users. Rights are assigned on a per-entity basis. RMS defines and recognizes several rights by default—such as permission to read, copy, print, save, forward, and edit—and can be extended to recognize additional rights (which each application would have to explicitly implement).

To protect content, a user specifies a usage policy that is to apply to the content. The user then submits the content and usage policy to an RMS-enabled application that applies the usage policy to the content. Although users can (with sufficient technical expertise) create their own usage polices from scratch, users more typically access pre-created usage policy templates that define a usage policy. For example, a user can request a usage policy template from an RMS server. The usage policy is then attached to the document. When a user requests access to the content, the usage policy is evaluated to determine access rights for the user.

Accordingly, the use of RMS (or other DRM mechanisms), has become increasingly popular in the business setting to protect proprietary or confidential information within a business network. For example, a CEO of a large corporation may wish to distribute an e-mail that includes trade-secrets. Because of the confidential nature of this information, however, the CEO may wish to limit the actions recipients may take in regard to this message. For example, the CEO may wish to allow upper-level management to read, copy, print and save the confidential information; however, she may wish to limit other employees to read-only access or to no access at all. Accordingly, through the use of RMS the CEO can specify who is authorized to view the protected message and what actions they may take in regards thereto.

However, within many organizations (e.g., businesses), content usage policies (e.g., included in templates) are distributed and spread out across a number of RMS servers. In this environment, different sub-organizations (e.g., divisions, departments, etc) within an organization typically obtain content usage policies from different RMS servers. This distributed nature of content usage policies results in a number of problems in applying and maintaining content usage policies.

At least one problem is the difficulty in defining the content usage polices. For example, an organization may have organization-wide polices applicable to any content published within the organization. To make organization-wide policies available, the organization-wide policies must be pushed out to any and all RMS servers within the organization. Thus, an administrator is required to individually access each RMS server and update organization-wide polices at the RMS server. Based on the number of RMS servers within an organization, individually accessing and updating RMS servers can place a strain on administrator resources. Further, the frequency of change for organization-wide policy can also increase the strain on administrator resources (independent of the actual number of RMS servers). However, in the end, even if administrators are highly diligent, there still may be no way to accurately predict the rights for each and every user that might request access to content.

Further, different sub-organizations within an organization may have other specific polices configured to alter and/or supplement the organization-wide policies. Sub-organization policies can be beneficial since they permit sub-organizations (divisions, departments, etc.) to meet their specific policy requirements without impacting an entire organization. For example, an accounting department may have accounting-specific requirements that are not applicable to the rest of an organization. Accordingly, the accounting department can configure accounting policies to meet the accounting-specific requirements, without forcing the accounting policies on other portions of the organization.

In some environments, creation and control of sub-organizations is distributed out to the sub-organizations themselves (e.g., different sub-organizations may control their own RMS server). Unfortunately, distributed creation and maintenance of policies can result in the creation of potentially unwanted, unapproved, non-compliant, etc., policies. To verify that sub-organizations use only approved, compliant policies, an administrator may be required to access a number of RMS servers (e.g., for each sub-organization) and review any organization polices. The administrator can remove any unapproved, non-complaint, etc. usage polices that are identified. Thus, in some environments, an administrator is in part relegated to policing content usage polices. Accordingly, the availability of the administrator to perform other computer and network related duties is reduced.

In some environments an administrator may restrict creation and maintenance of polices to authorized personnel. However, the authorized personnel must still access each RMS server to create and maintain organization policies and any sub-organization specific polices. Thus, in some organizations administration duties can be distributed across sub-organizations. As such, there is always some chance that (e.g., content usage) polices can become inconsistent or simply don't-exist for a specified recipient. For example, if a content usage policy is changed after content has been protected using the content usage policy, users can be afforded or limited to inappropriate access to the document.

BRIEF SUMMARY

The present invention extends to methods, systems, and computer program products for workflow based authorization for content access. A computer system receives content having an existing access policy. The computer system determines that the access rights of any intended recipient of the received content are not sufficiently expressed in the existing access policy. The computer system triggers a workflow to evaluate the access rights of the intended recipient in response to determining that the access rights of the intended recipient are not sufficiently expressed in the existing access policy. The workflow at least partially automates the evaluation such that the human intervention associated with evaluating the intended user's access rights is reduced.

The computer system provides the triggered workflow with relevant inputs for evaluating access rights of the intended recipient in the received content. The workflow receives the relevant inputs for evaluating access rights of an intended recipient in received content. The workflow evaluates the access rights of the intended recipient based on the relevant inputs. Evaluation includes processing the relevant inputs in a defined sequence of actions to more fully express and/or determine the intended recipient's access rights in the received content.

The workflow formulates an indication of the more fully expressed rights of the intended recipient in the content. The workflow returns the indication of the more fully expressed rights to the application. The computer system receives the indication from the workflow. The computer system provides the intended recipient with access to the received content in accordance with the more fully expressed rights in the received indication.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for workflow based authorization for content access. A computer system receives content having an existing access policy. The computer system determines that the access rights of any intended recipient of the received content are not sufficiently expressed in the existing access policy. The computer system triggers a workflow to evaluate the access rights of the intended recipient in response to determining that the access rights of the intended recipient are not sufficiently expressed in the existing access policy. The workflow at least partially automates the evaluation such that the human intervention associated with evaluating the intended user's access rights is reduced.

The computer system provides the triggered workflow with relevant inputs for evaluating access rights of the intended recipient in the received content. The workflow receives the relevant inputs for evaluating access rights of an intended recipient in received content. The workflow evaluates the access rights of the intended recipient based on the relevant inputs. Evaluation includes processing the relevant inputs in a defined sequence of actions to more fully express and/or determine the intended recipient's access rights in the received content.

The workflow formulates an indication of the more fully expressed rights of the intended recipient in the content. The workflow returns the indication of the more fully expressed rights to the application. The computer system receives the indication from the workflow. The computer system provides the intended recipient with access to the received content in accordance with the more fully expressed rights in the received indication.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

With this description and following claims, a "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, it should be understood, that upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1:
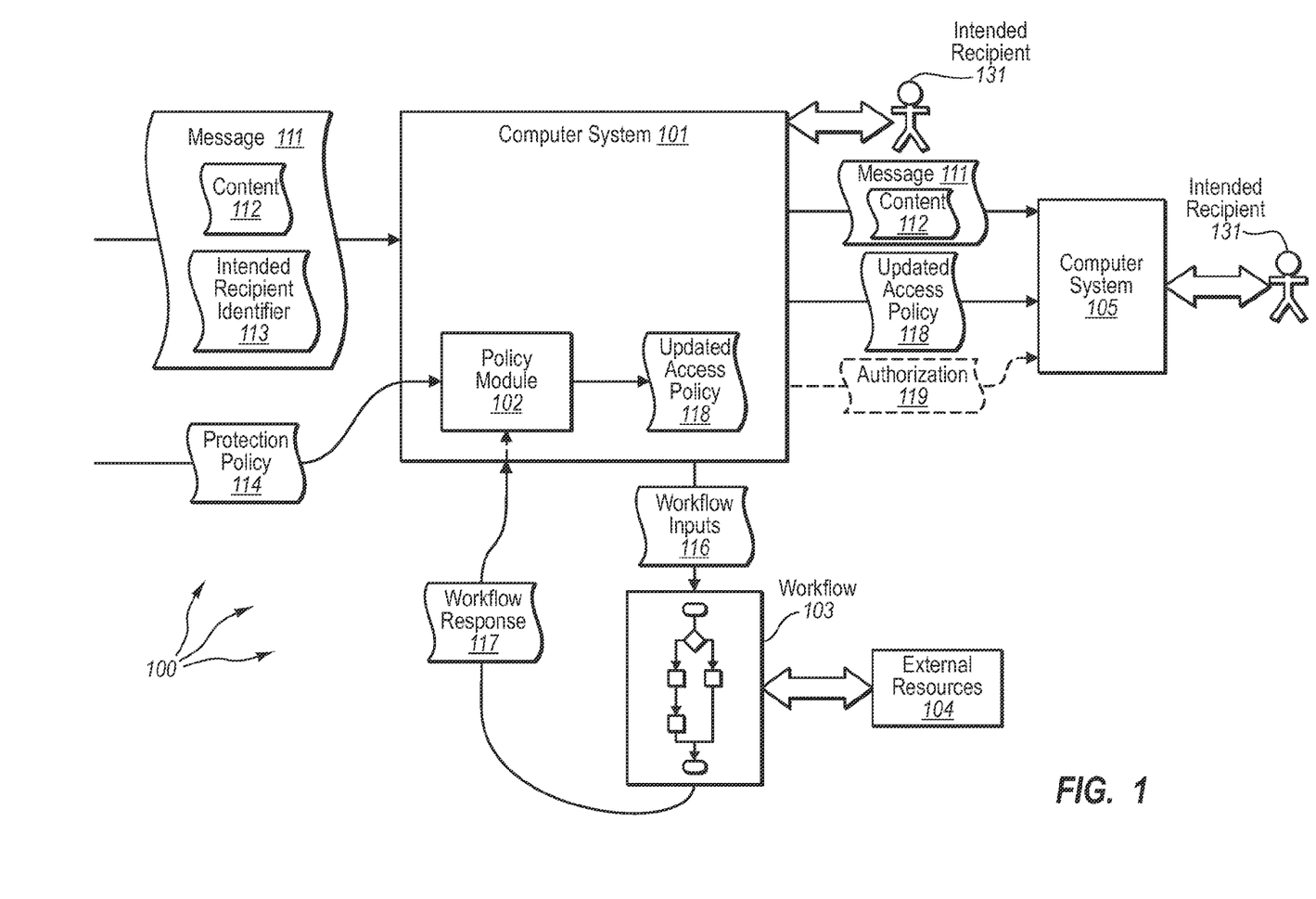
FIG. 1 illustrates a view of an example computer architecture that facilitates workflow based authorization for content access

FIG. 1 illustrates an example computer architecture 100 that facilitates workflow based authorization for content access. As depicted, computer architecture 100 includes computer system 101, computer system 105, workflow 103, and external resources 104. Each of the depicted components can be connected to one another over a system bus and/or over (or be part of) a network, such as, for example, a Local Area Network ("LAN"), a Wide Area Network ("WAN"), and even the Internet. Accordingly, each of the depicted components as well as any other connected components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Computer system 101 is configured to receive messages for intended message recipients. Computer system 101 can be a destination computer system for an intended recipient (e.g., a user's desktop computer) or can be a computer system that stores content for subsequent transfer to a destination computer system for an indented recipient (e.g., an electronic mail server). Computer system 101 includes policy module 102. Policy module 102 is configured to evaluate a protection policy for received content to determine if an intended recipient is authorized to access the message. Policy module 102 can interact with a protection server (e.g., a digital rights management server) to determine if an intended recipient of content is authorized to access the content.

When a protection policy does not sufficiently express the rights of an intended recipient, computer system 101 can trigger a workflow (e.g., workflow 103) that is configured to more fully express the rights of the intended recipient.

A workflow is a repeatable pattern of activity that can be constructed by ordering various elements to result in a work process. When applied to authorization for information access, a workflow can modify an existing information access policy, create a new policy and apply it to information, remove an existing policy, and make authorization decisions for access to content. For example, policy elements can be added, changed, or removed according to a situation (represented through relevant inputs) and the business logic driving the workflow. Business logic can include fetching data from an external source (e.g., validating a user's role in an HR database), getting authorization from approvers (e.g., notifying the appropriate people and requesting their approval, either from each person, one person, or n of m people), creating a log entry and verifying it, or even initiating other workflows.

Alternately, or in combination with policy element modifications, a workflow can also return an authorization decision indicating whether or not a requestor is permitted access to protected content. An authorization decision can happen asynchronously, such as, for example, when human intervention or authorization is required.

A workflow can be triggered expressly by a human or programmatic event or it can be triggered implicitly when an information access system requests an authorization decision. For example, a workflow can be triggered by receiving a message containing protected content, reclassifying content, moving content to a new location, sharing content with other entities, etc.

A workflow can be coded or data-driven. A coded workflow includes programmatic code that executes in a pre-determined sequence. A data-driven workflow includes a data file that describes the actions to execute and the sequence for those actions based on received inputs. That is, the actions are essentially componentized permitting many paths through the workflow to be described depending on received inputs and outputs of individual components.

When a request is made, the request can include the evaluation of a protection policy against a number of inputs. Accordingly, computer system 101 can submit relevant inputs (e.g., workflow inputs 116) to a workflow for determining an intended recipient's rights in content. Relevant inputs can include the resource or information being requested, the identity of the requester, and some context about the environment in which the access is to occur (machine identity, machine health, physical location, etc.). Computer system 101 is configured to receive results back from workflows and enforce the decisions indicated in the results.

In embodiments where computer system 101 stores content for subsequent transfer, computer system 105 can be configured as a destination computer system for an intended recipient. In these embodiments, computer system 101 can send content, updated access policies, and authorization decisions to computer system 105 for enforcement.

External resources 104 include other resources that a workflow can refer to when executing actions. External resources 104 can include, for example, databases, human personnel, log files, and other workflows. Thus, in some embodiments, one workflow can trigger another workflow during the course of processing relevant inputs when modifying a policy or making an authorization decision.

Figure 2:
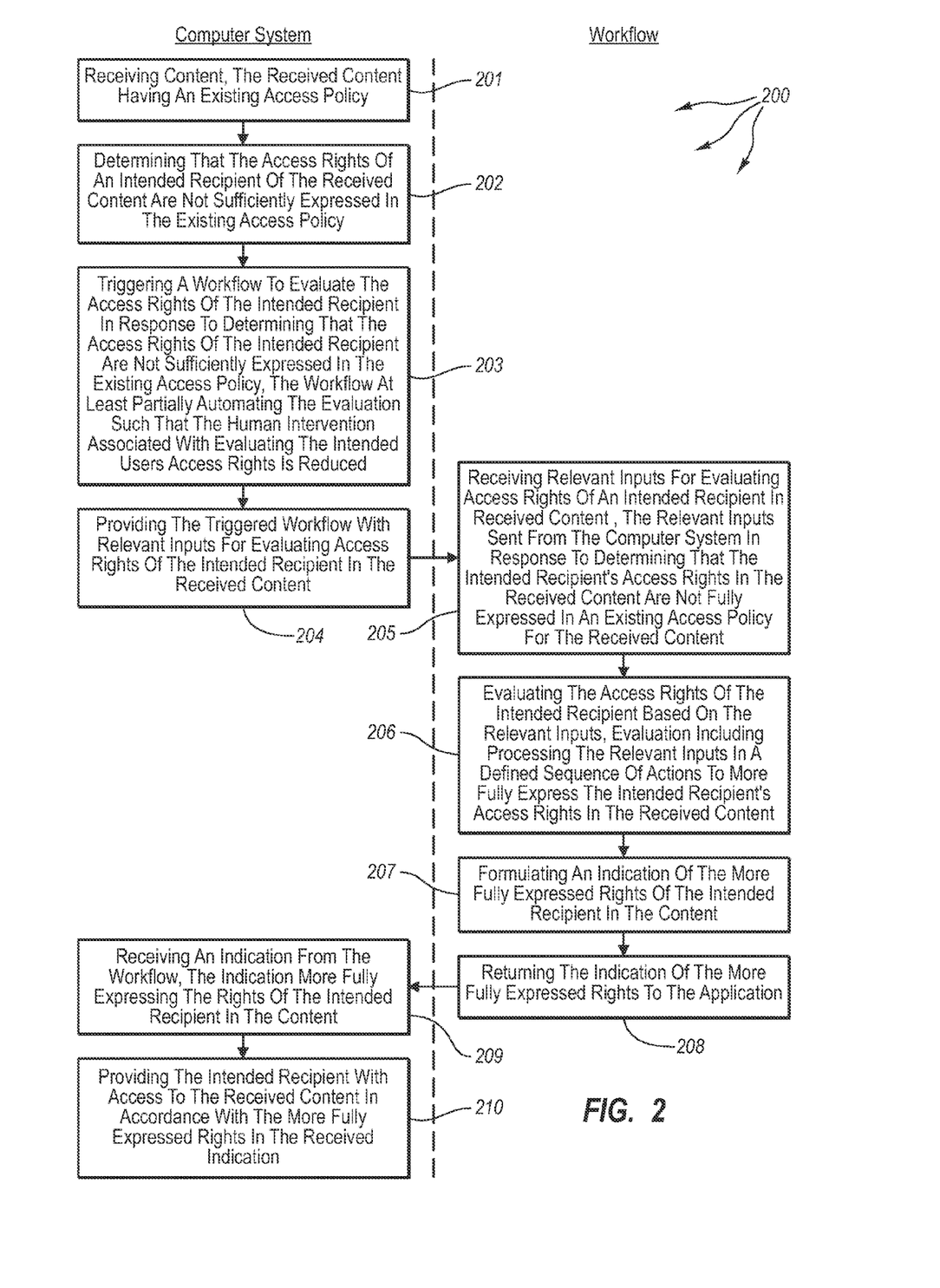
FIG. 2 illustrates a flow chart of an example method for workflow based authorization for content access.

FIG. 2 illustrates a flow chart of an example method 200 for workflow based authorization for content access. Method 200 will be described with respect to the components and data in computer architecture 100.

Method 200 includes an act of receiving content, the received content having an existing access policy (act 201). For example, computer system 101 can receive message 111. Message 111 contains content 112 and intended recipient identifier 113. Intended recipient identifier 113 can be any data, such as, for example, an email address, a user name, a group name, etc., identifying a user, group, etc. that accesses content via computer system 101. Separately, along with, or included in message 111, computer system 101 also receives protection policy 114. Protection policy 114 can indicate the rights of one or more principals, for example, users and/or groups in content 112. Protection policy 114 can be administered by a Digital Rights Management (DRM) system.

Method 200 includes an act of determining that the access rights of an intended recipient of the received content are not sufficiently expressed in the existing access policy (act 202). For example, computer system 101 can determine that the access rights of intended recipient 131 in content 112 are not sufficiently expressed in protection policy 114. Computer system 101 can determine that intended recipient identifier 113 corresponds to user 131. Policy module 102 can then process protection policy 114 to determine if protection policy 114 sufficiently expresses the rights of user 131 in content 112.

Rights expressed in a protection policy are not sufficiently expressed, for example, when rights for the intended recipient are not included in a protection policy, if rights for performing a specified operation are not included in a protection policy, etc. For example, the rights of intended recipient 131 in content 112 may not be sufficiently expressed if intended recipient 131 is not included in protection policy 114. Similarly, the rights of intended recipient 131 in content 112 may not be sufficiently expressed if intended recipient 131 intends to edit content 112 but protected policy 114 does not indicate write permission for intended recipient 131.

Alternately, even when a protection policy indicates rights in content, policy module 102 can determine that the rights are not sufficiently expressed due to other factors. Other factors can include: protection policy 114 being stale, the business owner of content 112 desiring heightened scrutiny before permitting access to content 112, logic within policy module 102 dictating that further access checks are to be performed, policy module 102's inability to process protection policy 114, etc. Thus, if a protection policy indicates that an intended recipient has a right with respect to content, policy module 102 can nonetheless determine that the right is not sufficiently expressed (and is to be re-evaluated and rights modified). For example, it may be that protection policy 114 grants intended recipient 131 unlimited accesses to content 112. However, policy module 102 can view protection policy 114 as insufficiently expressing rights for intended recipient 131.

In some embodiments, policy module 102 lacks the capabilities to authorize content access, computer system does not include a policy module, or computer system 101 requires external authorization for content access for some other reason. In these embodiments, computer system 101 implicitly determines that any received protection policy does not sufficiently express an intended recipient's rights in content. That is, it is inherent in any received protection policy that an intended recipients rights are not sufficiently expressed, since computer system 101 is not configured to authorize content access.

Method 200 includes an act of triggering a workflow to evaluate the access rights of the intended recipient in response to determining that the access rights of the intended recipient are not sufficiently expressed in the existing access policy, the workflow at least partially automating the evaluation such that the human intervention associated with evaluating the intended users access rights is reduced (act 203). For example, computer system 101 can trigger workflow 103 in response to determining that the rights of intended recipient 131 (in content 112) are not sufficiently expressed in protection policy 114. Workflow 103 can at least partially automate the evaluation of intended recipient 131's rights so as to reduce human intervention needed to determine intended recipient 131's rights.

Method 200 includes an act of providing the triggered workflow with relevant inputs for evaluating access rights of the intended recipient in the received content (act 204). For example, computer system 101 can provide workflow inputs 116 to workflow 103. Based at least in part on workflow inputs 116, workflow 103 can evaluate the rights of intended recipient 131 in content 112. Workflow inputs can include, for example, content 112, the identity of intended recipient 131, context of the environment where access is to occur (e.g., machine identity, machine health, physical location), etc. If content 112 is to be accessed at computer system 101, computer system 101 can provide its own environmental context. On the other hand, if content 112 is to be accessed at computer system 105, computer system 101 can provide environmental context for computer system 105.

Method 200 includes an act of receiving relevant inputs for evaluating access rights of an intended recipient in received content, the relevant inputs sent from the computer system in response to determining that the intended recipient's access rights in the received content are not fully expressed in an existing access policy for the received content (act 205). For example, workflow 103 can receive workflow inputs 116 from computer system 101. Workflow inputs 116 are sent from computer system 101 in response to determining that the access rights of intended recipient 131 (in content 112) are not fully expressed in protection policy 114.

Method 200 includes an act of evaluating the access rights of the intended recipient based on the relevant inputs, evaluation including processing the relevant inputs in a defined sequence of actions to more fully express the intended recipient's access rights in the received content (act 206). For coded workflows, programmatic code can process workflow inputs in a pre-determined sequence to evaluate the rights of intended recipient 131. For data-driven workflows, workflow 103 may initially determine an action sequence based on workflow inputs. Workflow 103 can then execute the determined action sequence using the workflow inputs 116 to evaluate the rights of intended recipient 131. For example, workflow inputs 116 can be processed by a sequence of actions in workflow 103 to more fully express intended recipient 131's rights in content 112. More fully expressed rights can include changes to policy items in protection policy 114 and/or an authorization decision permitting/denying access to content 112.

During execution, workflow 103 can to refer external resources 104. For example, workflow 103 can query one or more entities for approval, access data from a database, contact a DRM server, trigger further workflows, etc.

Method 200 includes an act of formulating an indication of the more fully expressed rights of the intended recipient in the content (act 207). For example, workflow 103 can formulate workflow response 117 indicating the more fully expressed rights of intended recipient 131 in content 112. Workflow response 117 can include changes to policy items in protection policy 114 and/or an authorization decision permitting/denying access to content 112.

The time period for formulating workflow response 117 can vary depending on the configuration of workflow 103. For example, workflow 103 can generate workflow response 117 relatively quickly when reference to external resources 104 is not needed or when reference to external resources 104 is limited to further electronic data. On the other hand, when reference to external resources 104 depends on further human input, such as, for example, a manager's approval, generation of workflow response 117 can take longer.

Method 200 includes an act of returning the indication of the more fully expressed rights to the application (act 208). For example, workflow 103 can return workflow response 117 to computer system 101. Method 200 includes an act of receiving an indication from the workflow, the indication more fully expressing the rights of the intended recipient in the content (act 209). For example, computer system 101 can receive workflow response 117 from workflow 103.

Method 200 includes an act of providing the intended recipient with access to the received content in accordance with the more fully expressed rights in the received indication (act 210). For example, computer system 101 can provide intended recipient 131 with access to content 112 in accordance with more fully expressed rights in workflow response 117.

In some embodiments (when workflow response 117 includes policy item updates), workflow response 117 is forwarded to policy module 102. Policy module 102 can process policy item modifications indicated in workflow response 117 to generate updated access policy 118. Updated access policy 118 can more fully express the rights of intended recipient 131 in content 112. When appropriate, policy module 102 can then use updated access policy 118 to permit/deny intended recipient 131's access to content 112.

In other embodiments, computer system 101 relies on an authorization decision contained in workflow response 117 to permit/deny intended recipient 131's access to content 112.

In further embodiments (when workflow response 117 includes policy item updates and an authorization decision), computer system 101 can both generate updated access policy 118 and rely on a contained authorization for permitting/denying access to content 112.

When content 112 is to be accessed at computer system 101, computer system 101 can implement an authorization decision to permit/deny intended recipient 131's access to content 112 at computer system 101.

On the other hand, when content 112 is to be accessed at computer system 105, computer system 101 can forward appropriate information to computer system 105 along with content 112. For example, computer system 101 can forward updated access policy 118 to computer system 105. A policy module at computer system 105 can process updated access policy 118 to permit/deny access to content 112. Alternately or in combination, computer system 101 can send authorization 119 to computer system 105. Computer system 105 can implement an authorization decision (either processed or received) to permit/deny intended recipient 131's access to content 112 at computer system 105.

In some embodiments, computer system 101 is a message (e.g., electronic mail) server that stores messages until requested by a message (e.g., electronic mail) client. Computer system 105 is an end user computer system that includes a message client. Thus, intended recipient 131 can use the message client to access messages from computer system 101.

Computer system 101 may be configured to hold messages containing protected content until intended recipients' access rights are sufficiently expressed. That is, until an intended recipient's rights in protected content are sufficiently expressed, computer system 101 does not return a message to a message client in response to a request for messages. For example, computer system 101 can hold message 111 until workflow 103 completes.

After workflow 103 completes and policy item updates and/or authorization is processed, computer system 101 can make message 111 available. Computer system 105 can subsequently request message 111. In response to the request, computer system 101 can send message 111 and one or more of updated access policy 118 and authorization 119. Since computer system 101 performs processing for updating protection policies and/or authorizes content access, the processing burden on message clients is significantly reduced, if not essentially eliminated.

For example, upon receiving updated access policy 118, computer system 105 can more easily determine intended recipient's 131 rights in content 112, since updated access policy 118 more fully expresses the rights of intended recipient 131. That is, computer system 105 is relieved from having to update protection policy 114. Upon receiving authorization 119, computer system 105 can rely on authorization 119 to permit/deny intended recipient 131's access to content 112. Thus, computer system 105 is relieved from having to make an authorization decision at all. Accordingly, message clients benefit from processing at computer system 101 such that the message clients can more efficiently permit/deny access to the protected content.

This can be particularly useful in messaging environments, such as, for example, electronic mail, where messages reside at a message server for some amount of time prior to being requested. An electronic mail server can delay availability of electronic messages until access rights in protected content are sufficiently expressed.

Further, by using workflows to make an authorization decision, access to information can become more flexible, allowing it to follow the desired flow of information throughout its lifecycle. This flexibility allows organizations to protect their information without worrying about the protection stopping the natural flow of business.

For example, the use of workflows also facilitates at least the following scenarios. In one scenario, an author creates a confidential document, protects it with a specific policy, and sends it to a recipient. The recipient and the author collaborate on the document for some time. Later on, the recipient decides to send the document to his manager, who is not included in the specific policy, in order to get feedback on the document. When the manager tries to access the content and an information access system can determine that he/she is not granted access in the specific policy. Accordingly, a workflow is applied to resolve the situation.

On behalf of the manager, the information access system can send an access request to the author. The author can approve the access request from his e-mail inbox (for example) without having to modify the policy on the document or redistribute the document. The workflow can then modify the policy itself and inform the manager that access has been granted. When the manager attempts to access the document again, access will be granted based on authorization from the workflow.

Further, the information access system could have detected that the manager would not be able to access the document that was being sent and it could have automatically applied the workflow at that time (prior to a request for the document), optionally holding the message from final delivery until access had been granted.

In another scenario, an author in company A attempts to send a protected confidential document out to an external partner in company B. Upon detecting this action, a messaging system can start a workflow that will send the document first to the legal document for approval and then to the manager for final sign-off before sending the document to the external partner. In each step along this process, the information access system modifies the policy accordingly based on the workflow.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. In a computer architecture comprising at least a processor, a method for determining access rights of a content recipient to access content, the method comprising:
an act of receiving content, the received content having an existing access policy, the policy being associated with one or more sufficiency factors that are used to determine whether an access policy is sufficiently expressed with respect to actions that can be performed on the content by the content's intended recipient;
an act of automatically determining that at least one of the sufficiency factors associated with the access policy is absent for the received content, indicating that the access rights of the intended recipient of the received content are not sufficiently expressed in the existing access policy;
an act of the processor automatically triggering a workflow to evaluate the access rights of the intended recipient in response to determining that the access rights of the intended recipient are not sufficiently expressed in the existing access policy, the workflow at least partially automating the evaluation such that human intervention associated with evaluating access rights for intended users is reduced;
an act of providing the triggered workflow with relevant inputs for evaluating access rights of the intended recipient in the received content;
an act of receiving an indication from the workflow, the indication more fully expressing the access rights of the intended recipient in the content; and
an act of providing the intended recipient with access to the received content in accordance with the more fully expressed rights in the received indication.

2. The method as recited in claim 1, wherein the act of triggering a workflow to evaluate access rights for the intended recipient comprises an act of triggering a workflow in response to receiving the content at a location the intended recipient is known to access content from.

3. The method as recited in claim 1, wherein the act of triggering a workflow to evaluate access rights for the intended recipient comprises an act of triggering a workflow in response to the intended recipient attempting to access the received content.

4. The method as recited in claim 1, wherein the act of triggering a workflow to evaluate the access rights of the intended recipient comprises an act of triggering a code-based work flow that executes in a pre-determined sequence.

5. The method as recited in claim 1, wherein the act of triggering a workflow to evaluate the access rights of the intended recipient comprises an act of triggering a data-driven workflow that describes actions to execute and a sequence for executing the described actions based on circumstances related to the intended recipient attempting to access the received content.

6. The method as recited in claim 1, wherein the act of providing the triggered workflow with relevant inputs comprises providing the triggered workflow with one or more of the following: protected content, an identity of the intended recipient, document-specific information, and a context of an environment where access is to occur, the triggered workflow being configured to receive a variety of different properties as inputs.

7. The method as recited in claim 1, wherein the act of receiving an indication from the workflow comprises an act of receiving an indication that policy items are to be added to, removed from, or modified within the existing access policy.

8. The method as recited in claim 6, wherein the act of providing the intended recipient with access to the received content in accordance with the more fully expressed rights in the received indication comprises an act of adding policy items to, removing policy items from, or modifying policy items within the existing access policy.

9. The method as recited in claim 1, wherein the act of receiving an indication from the workflow comprises an act of receiving an authorization decision from at least one of the workflow and a computer user.

10. The method as recited in claim 1, further comprising:
an act of notifying the intended recipient that the intended recipient has been granted access to the received content.

11. The method as recited in claim 1, further comprising an act of detecting that the intended recipient is requesting access to the received content; and
wherein the act of triggering a workflow comprises triggering a workflow in response to the detecting the request.

12. The method as recited in claim 1, further comprising:
an act of preventing access to protected content until the indication is received from the workflow.

13. In a computer architecture, a method for determining access rights of a content recipient to access content, the method comprising:
an act of a workflow receiving relevant inputs for evaluating access rights of an intended recipient in received content from an application, the received inputs including an associated access policy that is associated with one or more sufficiency factors that are used to determine whether an access policy is sufficiently expressed with respect to actions that can be performed on the content by the content's intended recipient, the relevant inputs sent from a computer system in response to determining that at least one of the sufficiency factors associated with the access policy is absent in the received content, indicating that the intended recipient's access rights in the received content are not fully expressed in the associated access policy for the received content;
an act of the workflow automatically evaluating the access rights of the intended recipient based on the relevant inputs, evaluation including processing the relevant inputs in a defined sequence of actions to more fully express the intended recipient's access rights in the received content;
an act of the workflow formulating an indication of the more fully expressed rights of the intended recipient in the content; and
an act of the workflow returning the indication of the more fully expressed rights to the application.

14. The method as recited in claim 13, where the act of the workflow evaluating the access rights of the intended recipient comprises the workflow retrieving referring data from an external data source.

15. The method as recited in claim 13, where the act of the workflow evaluating the access rights of the intended recipient comprises the workflow requesting authorization from one or more human approvers to implement one or more access policy changes.

16. The method as recited in claim 13, where the act of the workflow evaluating the access rights of the intended recipient comprises the workflow initiating one or more additional workflows.

17. The method as recited in claim 13, where the act of the workflow evaluating the access rights of the intended recipient comprises a code-based workflow executing a pre-determined sequence of actions.

18. The method as recited in claim 13, where the act of the workflow evaluating the access rights of the intended recipient comprises a data-driven workflow executing described actions in a sequence, wherein the sequence is based on circumstances related to the intended recipient attempting to access the received content.

19. The method as recited in claim 13, wherein the act of formulating an indication of the more fully expressed rights of the intended recipient in the content comprises an act of determining access policy changes to be applied to the existing access policy.

20. A computer system, the computer system comprising:
one or more processors;
system memory;
one or more physical store media having stored thereon computer-executable instructions that, when executed at one of the processors, cause the computer system to:
receive content from an application, the received content having an existing access policy that defines users' access rights and is associated with one or more sufficiency factors that are used to determine whether an access policy is sufficiently expressed with respect to actions that can be performed on the content by the content's intended recipient;
automatically determine, without human intervention, that at least one of the sufficiency factors associated with the access policy is absent for the received content, indicating that the access rights of the intended recipient of the received content are not sufficiently expressed in the existing access policy;
based on the determination, automatically trigger a workflow to evaluate the access rights of the intended recipient in response to determining that the access rights of the intended recipient are not sufficiently expressed in the existing access policy, the workflow at least partially automating the evaluation such that human intervention associated with evaluating access rights for intended users is reduced;
provide the triggered workflow with relevant inputs for evaluating access rights of the intended recipient in the received content;
receive an indication from the workflow, the indication more fully expressing the access rights of the intended recipient in the content; and
provide the intended recipient with access to the received content in accordance with the more fully expressed rights in the received indication, including one or more of: updating policy elements in a protection policy to generate an updated protection policy and relying on an authorization decision; and
wherein the workflow is configured to:
receive relevant inputs for evaluating access rights of an intended recipient in received content, the relevant inputs sent from the computer system in response to determining that the intended recipient's access rights in the received content are not fully expressed in an existing access policy for the received content;
evaluate the access rights of the intended recipient based on the relevant inputs, evaluation including processing the relevant inputs in a defined sequence of actions to more fully express the intended recipient's access rights in the received content, including one or more of indicating policy items in the protection policy are to be updated and generating an authorization decision for the intended recipient;
formulate an indication of the more fully expressed rights of the intended recipient in the content; and
return the indication of the more fully expressed rights to the application.

* * * * *